Reissued July 16, 1929.

Re. 17,377

UNITED STATES PATENT OFFICE.

HOWARD W. MATHESON, OF MONTREAL WEST, QUEBEC, CANADA, ASSIGNOR TO CANADIAN ELECTRO PRODUCTS COMPANY, LIMITED, OF MONTREAL, CANADA.

MANUFACTURE OF ACETIC ACID.

No Drawing. Original No. 1,410,207, dated March 21, 1922, Serial No. 203,972, filed November 26, 1917. Application for reissue filed January 11, 1926. Serial No. 80,680.

This invention relates to improvements in manufacture of acetic acid, and the object of the invention is to provide for commercial manufacture of acetic acid at a high rate of speed and low cost.

A number of methods of producing acetic acid synthetically have been discussed in recent years. These methods naturally revolve around a method of combining oxygen with acetaldehyde and various processes have been proposed for carrying out this combination. As laboratory experiments, these proposed processes are quite simple, but from a commercial point of view, they are for the most part impracticable for various reasons, such as the high cost of catalysts used, the high cost of preparing pure oxygen, the small production of acid, and the danger of serious explosion due to the use of pure oxygen. From a commercial point of view, the acid must be produced fairly pure and readily purifiable; the time of reaction must be reasonably short; the catalyst used must be inexpensive; and the whole process must be capable of being carried out on a large scale in commercially practicable apparatus. It is obvious that many operations may be carried on under laboratory conditions and with laboratory apparatus, which are utterly impracticable or impossible on a commercial scale, owing to the cost of materials and the very great difference in the possibilities of small laboratory apparatus and large commercial apparatus. The present invention aims to produce acetic acid in commercial quantities in a high state of concentration and purity, using inexpensive materials and comparatively inexpensive and commercially practicable apparatus. It has been found that the rate of combination of oxygen and aldehyde can be very greatly increased if the reaction is carried out under considerable pressure, and furthermore, that the reaction proceeds more rapidly and effectively at high temperatures. This is a fortunate circumstance, as the possibility of using high pressures makes it possible to use higher temperatures than would otherwise be feasible, as the increase of pressure naturally raises the boiling point of the reaction liquid and permits the reaction to be carried out at higher temperature without ebullition. Under these conditions, oxygen may be completely absorbed from air, leaving only nitrogen mixed with aldehyde and acetic acid vapor. It has been stated in former patents, and much emphasis laid on the statement, that the production of acetic acid proceeds much more readily in the presence of an excess of acetic acid, and in some instances, an initial charge of acetic acid was provided in the reaction vessel. I have found that the presence of acetic acid is not essential to a satisfactory reaction, as the production of acid proceeds according to this invention as rapidly in pure acetaldehyde as in a mixture of aldehyde and acetic acid.

The invention consists briefly in passing air through acetaldehyde under pressure between 20 pounds and 120 pounds per square inch super-atmospheric in the presence of a suitable catalyst, and maintaining the temperature at the degree of greatest efficiency for the pressure used, for example, between 20° and 75° C., for pressures of about seventy-five pounds per square inch super-atmospheric. The vapors which form in the kettle are condensed ordinarily under the same pressure as obtains in the kettle, and the yield of the condensers, which is weak acetic acid and aldehyde, is returned to the reaction. Gases escaping from the condensers are scrubbed to remove aldehyde. When the reaction is complete, the acetic acid is distilled to remove impurities.

In greater detail the process is as follows:—A kettle having a lining, which is impervious to the action of both aldehyde and acetic acid, such as aluminum, is provided with a series of coils, through which water or steam may be passed to regulate the temperature of the reaction. An air pipe is provided extending to the bottom of the kettle, where it is arranged in spiral form, the spiral being provided with a multitude of small openings from which the air may emerge, so as to pass through the whole volume of the reaction liquid. The air is thus distributed through the liquid in the best manner for rapid absorption of the oxygen therefrom, and it furthermore serves to keep the catalyst in suspension until the same is dissolved. The kettle is charged with a thousand gallons of aldehyde and an appropriate amount of any suitable substance which will act as a catalyst. Steam or warm water is passed through the coils to raise the temperature of the aldehyde rapidly to a point where it will react with the oxygen of the air, namely, 20° to 25° C.

Air is now passed in through the air pipe and bubbles up through the entire body of aldehyde, thus serving to keep the catalyst in suspension. The air is passed in only at such rate as substantially all the oxygen thereof is absorbed by the aldehyde. At first, the rate of admission is low, because of the low pressure and temperature and relative inactivity of the catalyst. When the catalyst becomes active, the rate of air admission is increased according to the rate of oxygen absorption. As the reaction becomes more vigorous, the temperature tends to rise due to heat liberated in the reaction and the pressure correspondingly tends to increase. This pressure increase is augmented by accumulation of nitrogen in the system, which accumulation may of course be relieved as necessary to govern the pressure. Excess heat is removed by circulating cold water through the coils in the kettle and the temperature is by this means partly controlled. The rate of air admission also partly controls the temperature. The pressure is allowed to rise slowly to about 75 pounds per square inch superatmospheric and the temperature to about 65° C., the air input being meanwhile increased to about 300 cubic feet per minute. Under these conditions the reaction proceeds smoothly, safely and efficiently and the conditions may be maintained until the reaction is complete by cooling and by blowing off nitrogen. The air admission is regulated as necessary to ensure that substantially no oxygen escapes from the surface of the liquid into the atmosphere above it and which consists chiefly of aldehyde vapor and nitrogen. The temperature and pressure may be increased, permitting increase in the rate of air admission, or may be decreased with, of course, corresponding reduction in the air supply to ensure substantially complete oxygen absorption. For practical reasons, the limit of temperature is the temperature at which ebullition of the liquid commences, which temperature becomes higher as the concentration of acid increases, but the limit of pressure is merely a question of safety. Obviously, increases of pressure raise the ebullition temperature and permit the use of higher temperatures than would be possible at lower pressures.

There is a direct relation between the rate of oxygen absorption and the pressure and temperature, the rate of absorption increasing as the pressure and temperature rise. In general terms, the increased absorption obtainable from a combined pressure and temperature increase is greater than the sum of the absorption increases obtainable from separate pressure and temperature increases. It has been found that a very efficient rate of absorption is secured at a pressure of about seventy-five pounds per square inch superatmospheric when the temperature is about 65° to 75° C.

Under conditions outlined, the oxygen of the air is substantially all absorbed, and the aldehyde converted into acetic acid, thus leaving nitrogen, and possibly a small amount of carbon dioxide, in the reaction vessel. The nitrogen is allowed to escape. As the escaping nitrogen entrains a considerable amount of acetic vapor and aldehyde, it is passed through suitable condensing apparatus most conveniently maintained at the same pressure as the reaction vessel, where the acetic acid and aldehyde are condensed, and from which they are returned to the reaction vessel. This condensing apparatus preferably takes the form of a water condenser maintained at a temperature of 1 to 5° C., into which the vapors first flow, and a brine condenser kept at a temperature of −10° to −15° C., into which the vapors escaping from the water condenser pass. The greater part of the acetic acid vapors are condensed in the water condenser and the greater part of the aldehyde in the brine condenser. The aldehyde condensate is preferably returned to the reaction vessel through U seals and, if desired, the acid condensate may be similarly returned. Vapors not condensed escape through a relief valve set according to the pressure under which the reaction is carried out to a scrubber, which is kept at a pressure of say twenty pounds to the square inch. The scrubber is supplied with cold water and serves to remove uncondensed aldehyde from the nitrogen, which is allowed to escape to the atmosphere. The operation of the scrubber is not essential to the carrying out of the process, except from an economic point of view. It has been found that from 6% to 8% of the original amount of aldehyde may be recovered in the scrubber, which when suitably rectified can be used again.

At the end of from eight to eighteen hours, the time depending on the pressure, temperature and rate of air supply, the reaction is complete, and the kettle contains crude acetic acid of 95% concentration, or over, together with the dissolved catalyst. The contents of the kettle are discharged into storage tanks and refined in stills; the distilled product being acetic acid of a very high grade of purity, averaging from 98% to 99.9% concentration. In appearance, it is a clear liquid of pale straw color when drawn off from the reaction vessel. This invention not only produces acid of great purity, but also gives a very high yield. The yield averages from 90% to 95% of the theoretical amount.

While a number of substances may be used as catalysts, I have found .03 to .5% of manganese acetate to be suitable, both from the point of view of its action and from the point of view of its low cost.

One of the great advantages of this invention is that by utilizing both high temperature and high pressure, oxygen can be substantially completely absorbed from the air, so that the gases passing from the reaction vessel contain practically no free oxygen, along with the nitrogen and aldehyde vapors. This is an essential feature, as it has been found that the presence of even a small percentage of oxygen with the aldehyde makes the mixture extremely sensitive to explosion. Another advantage is obviously the ability to use air instead of previously prepared oxygen. Still another advantage is the very large yield of practically pure, highly concentrated acid produced in short periods of time.

Having thus described my invention, what I claim is:—

1. A process for the manufacture of acetic acid which comprises passing air into acetaldehyde containing a catalyst at practical temperatures above 65° C., while maintaining pressure sufficient to prevent ebullition of the reaction liquid.

2. A process for the manufacture of acetic acid which comprises passing air into acetaldehyde containing a catalyst under pressure between 20 pounds and 120 pounds per square inch super-atmospheric, while maintaining temperatures between 65° and 75° C.

3. A process for the manufacture of acetic acid which comprises passing air into acetaldehyde containing a catalyst under pressure between 20 pounds and 120 pounds per square inch super-atmospheric, while maintaining temperature between 65° C. and a point below the ebullition temperature of the reaction liquid at the pressure used.

4. A process for the manufacture of acetic acid which comprises passing air into acetaldehyde containing a catalyst under pressure of about 75 pounds per square inch super-atmospheric, while maintaining temperature between 20° and 75° C.

5. A process for the manufacture of acetic acid which comprises passing air into acetaldehyde containing a catalyst under pressure of about 75 pounds per square inch super-atmospheric, while maintaining temperature of about 65° to 75° C.

6. A process for the manufacture of acetic acid which includes passing air into acetaldehyde containing a catalyst under pressure between 20 pounds and 120 pounds per square inch super-atmospheric, and maintaining the temperature at the degree of greatest efficiency between 20° C. and the ebullition temperature of the acetic acid-acetaldehyde reaction mixture for the pressure used.

7. In a process for the manufacture of acetic acid from acetaldehyde and air under pressure between 20 pounds and 120 pounds per square inch super-atmospheric and at temperature between 20° C. and the ebullition point of the reaction liquid at the pressure used, the step of supplying the air at such rate that oxygen is supplied at a rate only slightly below the rate of its absorption.

8. A process for the manufacture of acetic acid, which comprises heating acetaldehyde to a temperature of 20° to 25° C. and passing air into the aldehyde in presence of a catalyst while allowing the pressure to rise to approximately 75 pounds per square inch super-atmospheric and the temperature to about 65° C. but at no time above the ebullition temperature of the reaction liquid at the pressure obtaining, and increasing the air input until the rate of oxygen supply thereby effected is substantially equal to the rate of oxygen absorption, and continuing under temperature and pressure conditions not below those attained until at least 90% of the aldehyde is oxidized to acetic acid.

9. A process for the manufacture of acetic acid, which comprises heating acetaldehyde to a temperature of 20° to 25° C. and passing air into the aldehyde in presence of a catalyst while allowing the pressure to rise to approximately 75 pounds per square inch super-atmospheric and the temperature to about 65° C. but at no time above the ebullition temperature of the reaction liquid at the pressure obtaining, and increasing the air input until the rate of oxygen supply thereby effected is substantially equal to the rate of oxygen absorption, and continuing under substantially the conditions attained until oxidation of the aldehyde is substantially complete.

10. A process for the manufacture of acetic acid, which comprises heating acetaldehyde to a temperature of 20° to 25° C. and passing air into the aldehyde in presence of a catalyst while allowing the pressure to rise to approximately 75 pounds per square inch super-atmospheric and the temperature to about 65° C. but at no time above the ebullition temperature of the reaction liquid at the pressure obtaining, increasing the air input until the rate of oxygen supply thereby effected is substantially equal to the rate of oxygen absorption, continuing under substantially the conditions attained until oxidation of the aldehyde is substantially complete, condensing aldehyde vapor entrained by escaping nitrogen at substantially reaction pressure, and returning the condensate into the reaction.

11. A process for the manufacture of acetic acid, which comprises passing air into acetaldehyde in presence of a catalyst and under pressure between 20 and 120 pounds per square inch superatmospheric, while maintaining the temperature at about 65° centigrade.

12. A process for the manufacture of acetic acid, which comprises passing air into acetaldehyde in presence of a catalyst and under pressure of about 75 pounds per square inch superatmospheric, while maintaining the temperature at about 65° centigrade.

13. A process according to claim 6, in which the pressure-temperature relation is of the order of about 75 pounds per square inch superatmospheric for temperatures of about 65° centigrade.

14. A process for the manufacture of acetic acid, which comprises passing air into a reaction liquid composed initially of acetaldehyde and after oxidation of the aldehyde commences composed of an acetaldehyde-acetic acid mixture the acid content of which gradually increases as the reaction progresses, in presence of a catalyst, in proportion of up to 300 cubic feet of air per minute to 1000 gallons of reaction liquid, and maintaining pressure between 20 and 120 pounds per square inch superatmospheric, and temperature below the ebullition temperature of the reaction liquid and high enough to ensure substantially complete absorption of the oxygen of the air.

15. A process for the manufacture of acetic acid, which comprises passing air into acetaldehyde in presence of a catalyst and under pressure up to 120 lbs. per square inch superatmospheric, the pressure rising at the commencement of the reaction to approximately seventy-five pounds per square inch superatmospheric, with accompanying temperature rise to approximately 65° C., the temperature being thereafter maintained at the degree of greatest efficiency for the pressure obtaining concurrently.

16. A process for the manufacture of acetic acid, which comprises passing air into acetaldehyde in presence of a catalyst and under pressure up to 120 lbs. per square inch superatmospheric, the pressure rising at the commencement of the reaction to approximately seventy-five pounds per square inch superatmospheric, with accompanying temperature rise to approximately 65° C., the temperature being thereafter maintained at the degree of greatest efficiency for the pressure obtaining concurrently, but at no time above the ebullition temperature of the reaction liquid at the pressure then obtaining.

17. A process for the manufacture of acetic acid, which comprises passing air into acetaldehyde in presence of a catalyst and under pressure between twenty and one hundred and twenty pounds per square inch superatmospheric, and maintaining a temperature which rises at the commencement of the reaction to approximately 65° C. and is thereafter held at a point below the ebullition temperature of the reaction liquid at the pressure obtaining concurrently.

18. A process for the manufacture of acetic acid, which comprises passing air into acetaldehyde in presence of a catalyst and under pressure between 20 and 120 pounds per square inch super-atmospheric, and maintaining a temperature which rises at the commencement of the reaction to approximately 65° C. and is thereafter held at the degree of greatest efficiency for the pressure obtaining concurrently.

19. A process for the manufacture of acetic acid, which comprises passing air into acetaldehyde containing a catalyst and maintained under pressure rising from 20 pounds to not above 120 pounds per square inch superatmospheric.

20. A process for the manufacture of acetic acid, which comprises passing air into acetaldehyde containing a catalyst and maintained under rising pressure, and maintaining a temperature at the degree of greatest efficiency for the pressure obtaining concurrently and not above the ebullition temperature of the reaction liquid at the pressure obtaining concurrently.

In witness whereof, I have hereunto set my hand.

HOWARD W. MATHESON.